US012674566B2

(12) United States Patent
Jonsson

(10) Patent No.: US 12,674,566 B2
(45) Date of Patent: Jul. 7, 2026

(54) LIGHTING STRIPS WITH MULTIPLE ISOLATED POWER BUSES

(71) Applicant: Karl S. Jonsson, Rancho Santa Margarita, CA (US)

(72) Inventor: Karl S. Jonsson, Rancho Santa Margarita, CA (US)

( * ) Notice: Subject to any disclaimer, the term of this patent is extended or adjusted under 35 U.S.C. 154(b) by 0 days.

(21) Appl. No.: 19/303,356

(22) Filed: Aug. 19, 2025

(65) Prior Publication Data

US 2026/0085825 A1 Mar. 26, 2026

Related U.S. Application Data

(60) Provisional application No. 63/698,117, filed on Sep. 24, 2024.

(51) Int. Cl.

*F21V 23/00* (2015.01)
*F21S 4/24* (2016.01)
*F21Y 113/13* (2016.01)

(52) U.S. Cl.

CPC .............. *F21V 23/003* (2013.01); *F21S 4/24* (2016.01); *F21Y 2113/13* (2016.08)

(58) Field of Classification Search

CPC ........ F21S 4/24; F21V 23/003; F21Y 2113/13
See application file for complete search history.

(56) References Cited

U.S. PATENT DOCUMENTS

2025/0185143 A1 6/2025 Jonsson
2025/0331077 A1 10/2025 Jonsson

FOREIGN PATENT DOCUMENTS

CN 113819411 A * 12/2021 ............ F21V 23/023
GB 2579840 A * 7/2020 ............ H05B 45/20

OTHER PUBLICATIONS

Richtek, "RT8250 3A, 23V, 340KHz Synchronous Step-Down Converter", Nov. 2024.
USC8904A Datasheet.
Worldsemi, "WS2811 Datasheet" 2019.
Worldsemi, "WS2812B Datasheet" , 2013.
Worldsemi, WS2812B Datasheet, May 30, 2035, Retrieved from https://www.digikey.com/htmldatasheets/production/1829370/0/0/1/ws2812b.pdf on Jul. 17, 2025.
Yujileds, Datasheet for YJ-BC-RGBWW-5050L-G03, Feb. 9, 2023, Retrieved from https://www.yujiintl.com/wp-content/uploads/2022/04/P3180001.00-2.0-YJ-BC-RGBWW-5050L-G03-2.pdf on Jul. 16, 2025.

* cited by examiner

*Primary Examiner* — Keith G. Delahoussaye
(74) *Attorney, Agent, or Firm* — Young's Patent Services; Bruce A. Young

(57) ABSTRACT

An LED lighting strip and system are disclosed, which includes a flexible, elongated printed circuit board (PCB) divided into multiple sections by cutlines. A PCB includes a first power bus with an anode and cathode conductor and a second power bus with an anode and cathode conductor. The two power buses extend along the length of the PCB and are electrically isolated from each other. Each section of the PCB contains lighting devices or LEDs, with at least one device powered by the first power bus and another device powered by the second power bus. Powering the lighting strip involves supplying first power to the first power bus and second power to the second power bus, each limited to no more than 100 W and no more than 60 V. This configuration enables longer lengths of lighting strips that draw more than 100 W without violating NEC class 2 limits.

20 Claims, 6 Drawing Sheets

LIGHTING STRIPS WITH MULTIPLE ISOLATED POWER BUSES

CROSS-REFERENCE TO RELATED APPLICATIONS

This patent application claims benefit to U.S. provisional patent application Ser. No. 63/698,117, filed on Sep. 24, 2024, which is hereby incorporated by reference herein in its entirety.

TECHNICAL FIELD

The present subject matter relates to lighting strips and more specifically, to power arrangements for flexible, sectionalized LED lighting strips using isolated power buses for enhanced power distribution and modular functionality.

BACKGROUND

In the USA, the National Electrical Code (NEC) as defined in NFPA 70 Article 725, classifies power-limited circuits as Class 2 when it's under 60 Volts (V) and under 100 Watts (W). Class 2 devices can be installed by anyone and do not require an electrician. Once the power or voltage exceeds 60 V or 100 W, it is considered Class 1 power, which requires an electrician for installation.

For light emitting diode (LED) strips, also referred to as tape lights or strip lights, state-of-the-art types often operate at power levels around 20 W per meter or even higher. This means that a tape light can only be sold as Class 2 in reels of 5 meters or less. The length of an LED strip is also limited by other factors, including voltage drops that result in uneven light distribution throughout the strip.

BRIEF DESCRIPTION OF THE DRAWINGS

The accompanying drawings, which are incorporated in and constitute part of the specification, illustrate various embodiments. Together with the general description, the drawings serve to explain various principles. In the drawings.

DETAILED DESCRIPTION

Figure 1:
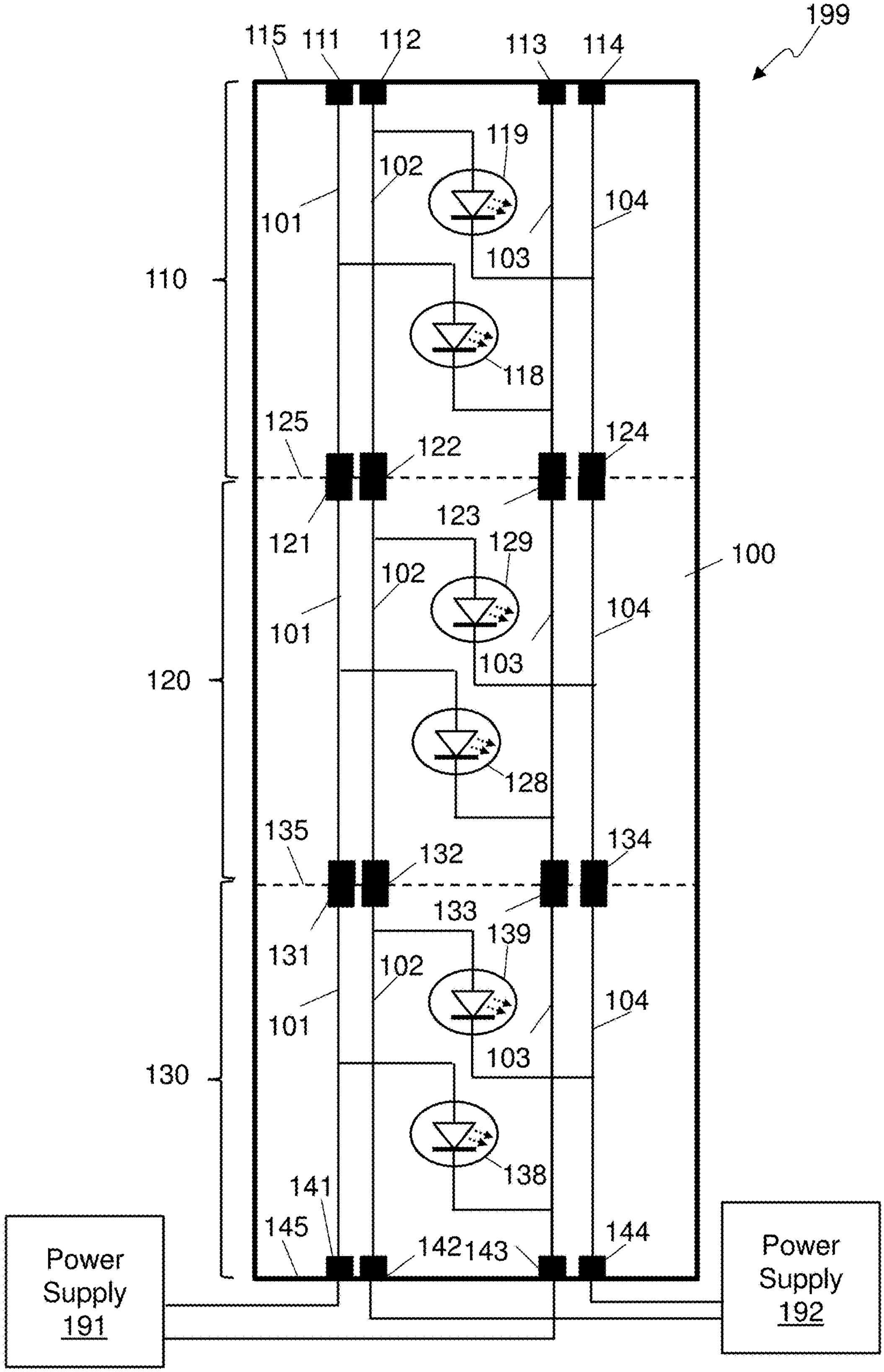
FIG. 1 illustrates an example lighting system.

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures and components have been described at a relatively high level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification.

The present disclosure relates generally to modular lighting strips comprising multiple sections that can be separated at designated cut lines. Each section includes a plurality of lighting devices electrically coupled between specific anode and cathode contacts, with each anode/cathode pair isolated from other pairs to maintain independent electrical pathways. Such isolation enables safe and reliable operation, particularly in high-power applications. While the term "LED" (light emitting diode) is predominantly used throughout this disclosure as a common and preferred example of a lighting device, it is expressly intended that any other suitable lighting device may be used in place of, or in addition to, LEDs. Examples of alternative lighting devices include, but are not limited to, organic light emitting diodes (OLEDs), laser diodes, electroluminescent devices, miniature incandescent lamps, or other solid-state or non-solid-state light sources that can be electrically powered and controlled in a similar modular strip configuration. The modular strip architecture, electrical isolation, and power management features described herein are broadly applicable to any such lighting devices, and references to "LED" or "LED strip" should be understood to encompass these broader alternatives unless otherwise specified.

Multi-channel LED strips like tunable white, red/green/blue (RGB), red/green/blue/white (RGBW), and other types, each color/channel may draw less than 20 W per meter (e.g., 100 W per 5 meter reel), but since all channels typically share a common anode, aggregating the current for all channels into a single conductor, the length for a class 2 installation is limited by NEC rules based on the total power drawn from by strip, not the power drawn by each channel.

The length of an LED strip is also limited by other factors, including voltage drops that result in uneven light distribution throughout the strip. However, these can be mitigated by using higher voltages, such as 48 V or up to 60 V, instead of the typical 12 V or 24 V. Higher voltage results in lower current, reducing the impact of resistance in the LED strip's flexible PCB copper. With thicker copper and 48-60 V, a strip could potentially be manufactured to run continuously for 100 feet or more.

To address the 100 W limit for the USA market (or other limits for other markets or future changes in regulatory requirements in the USA), a multi-channel strip can be manufactured with individual and isolated anodes and cathodes for each channel of the strip. For an RGB/Warm White/Cool White 5-channel strip as an example, this means the LED strip could be constructed to potentially pull a total of 500 W and still fall within the Class 2 limits because each channel is isolated and limited to 100 W. This approach requires the input conductors to a 5-channel strip to consist of 10 wire conductors versus only 6 (5 channels+common) in a traditional LED strip. A strip constructed in this way would allow a 20 W per meter strip to be sold and installed in a 25-meter continuous run by a non-electrician, while still being considered a Class 2 load under the NEC. The same approach can be used for other power limits. For example, if a power limit of 240 W were to be needed, the same 20 W/m LED strip could be sold and installed in a 60-meter continuous run (drawing 1200 W total) and still meet the 240 W limit for each isolated load.

In some aspects, modularity is achieved through the use of cut lines that split pairs of contacts, which remain electrically connected until separation. Upon separation, these contacts on each portion of the strip are accessible to connectors, facilitating reconfiguration or extension of the strip. This design supports flexible installation and customization for various lighting scenarios.

In embodiments described herein, a "power bus" refers to an electrically conductive pathway, typically comprising a pair of conductors such as an anode conductor and a cathode conductor, with electrically connected contacts for each, that extends along the length of the lighting strip and delivers electrical power to one or more lighting devices within each section.

Each power bus is electrically isolated from other power buses on the strip, allowing for independent power delivery and management for each group of lighting devices. By providing multiple power buses, each limited to a designated maximum power (for example, less than 100 W per bus), the lighting strip can safely support a total power draw that exceeds the limit for a single circuit, while ensuring that no individual power bus exceeds regulatory or safety thresholds. This architecture enables the use of longer or higher-power lighting strips without violating electrical safety standards, as each power bus operates as an independent channel with its own isolated current path. The modularity of the power bus arrangement also facilitates flexible configuration, sectioning, and control of the lighting devices, supporting both non-addressable and addressable lighting applications.

A technical term, "power group," refers to a set of LEDs and associated circuitry powered by a single power bus, isolated from other groups. The term "addressing chip" refers to a circuit, which may be implemented as a single integrated circuit or as a combination of multiple components, that is capable of receiving data signals and controlling the brightness of individual LEDs or groups of LEDs.

In addressable LED strip implementations, for each power group present in a section of the strip, there is an addressing chip in that section that is a part of that power group. The addressing chip receives data signals (for example, via a data conductor) and modulates the brightness of the LEDs in its power group and section according to the received data. This arrangement enables granular and power group specific control of lighting effects while maintaining electrical isolation and compliance with power limits for each group. In some embodiments, the addressing chip may be implemented as an integrated circuit such as a WS2811, WS2812, or UC8904, or as a combination of discrete components, and is positioned on the flexible PCB proximate to the LEDs it controls. The electrical isolation between addressing chips and power groups is maintained by isolation circuits, such as opto-isolators, and additional conductors for data and ground are provided as needed to support addressable functionality. This architecture allows for flexible, modular, and scalable addressable lighting solutions, with each power group operating independently.

In some embodiments, the LED strip features a cross-sectional arrangement where LED chips and other circuitry are mounted on one side of a flexible PCB, and multiple conductors are located on the opposite side. These conductors are accessible at each section boundary, allowing for reliable electrical connection via a connector. Each conductor is dimensioned to support high current capacity, enabling robust operation even in narrow strip formats. Other conductors may be included inside of the flexible PCB and/or on the same side of the PCB as the LED chips are mounted and may be interconnected using vias to allow for appropriate conductivity The present disclosure further contemplates that the number of power buses provided on a modular lighting strip may be two, three, five, or any other suitable number, with each power bus comprising an isolated anode/cathode conductor pair extending along the length of the strip. For example, in one embodiment, a five-channel strip may include five power buses, each with its own anode and cathode conductor, resulting in a total of ten conductors. Such a configuration enables the use of a 10-contact connector at each cutline, with each conductor dimensioned to reliably conduct the required current for its respective power group. A 10-contact connector is feasible for strips as narrow as 12 mm wide, as each conductor may be designed to use 1.2 mm of space on the strip's flexible PCB to be able to reliably conduct 2 Amps (100 W at 50V) through its conductor. In some implementations, the strip can be wider or narrower, such as a 20-25 mm wide strip which may accommodate thicker copper conductors.

In another embodiment, a three-channel strip may include three power buses, each with an anode and cathode conductor, for a total of six conductors, and a corresponding 6-contact connector at each cutline. The number of power buses and associated conductors may be selected based on the desired number of independently powered groups, the total power requirements, and the regulatory limits for each group.

In addition to the conductors for power buses, one or more additional contacts may be provided at each cutline for data conductors, such as a data input and/or data output conductor, to support addressable or digitally controlled lighting strips. For example, a five-channel addressable strip may include ten power conductors and one or two additional contacts for data and ground, resulting in an 11- or 12-contact connector at each cutline. Similarly, a three-channel addressable strip may include six power conductors and one or two additional contacts for data and ground, resulting in a 7- or 8-contact connector. The arrangement and number of conductors and contacts at each cutline are selected to support the desired number of power buses and data channels, while maintaining reliable electrical isolation and robust current-carrying capacity. Variations in strip width, conductor thickness, and connector design are contemplated to accommodate different numbers of power buses, data conductors, and current-carrying requirements, enabling flexible adaptation to a wide range of lighting applications and installation scenarios.

In certain embodiments, each power group within a section may include a dedicated power regulator that is electrically coupled between the corresponding power bus and the lighting device or devices of that group. The power regulator may be configured to receive input power from its associated power bus and to provide regulated power—such as a constant current or constant voltage output—suitable for driving the lighting device or devices in that group. This arrangement allows each power group to operate with stable and consistent electrical characteristics, regardless of variations in input voltage or load conditions along the length of the strip. The use of power regulators in each section and for each power group may further enhance the reliability and uniformity of light output, particularly in long or high-power lighting strips where voltage drops or supply fluctuations may otherwise affect performance.

In some implementations, the power regulators may be implemented as a single integrated circuit (IC) or as a circuit comprising multiple discrete components, such as transistors, diodes, resistors, capacitors, and inductors, depending on the specific requirements of the lighting devices and the desired performance characteristics. The power regulators may be of linear or switching type, with the choice of topology and implementation tailored to achieve the necessary efficiency, voltage or current regulation, and thermal management for each power group. For example, a linear regulator may be used for simplicity and low noise in applications with modest efficiency requirements, while a switching regulator (such as a buck, boost, or buck-boost converter) may be preferred for higher efficiency and better thermal performance in high-power or long-run lighting strips. The modular inclusion of power regulators for each power group and section also supports independent operation and control, enabling each group to be powered, dimmed, or modulated separately as needed. This architecture may be applied to both non-addressable and addressable lighting strips, and may be particularly advantageous in applications where precise control of light output, color, or power consumption is required across multiple independently powered groups or sections.

Present disclosure enables modular, high-power, and addressable LED lighting solutions with flexible installation, robust electrical isolation, and compliance with safety standards. Lighting strips as described herein allow for the compliant installation of long and/or powerful types of LED strips/tape light by non-electricians, such as technicians qualified for low-voltage cable installation.

FIG. 1 shows a block diagram of an example lighting strip (or LED strip) 100. The LED strip 100 is divided into two or more sections, such as a first section 110, a second section 120, and a third section 130 as shown for the example LED strip 100. An LED strip 100 may have any number of sections. Sections of the LED strip are separated by a cutline which allow users to customize the length of the strip 100. First section 110 is separated from second section 120 by cutline 125 and second section 120 is separated from third section 130 by cutline 135. Example LED strip 100 has been separated from other sections by a cut at cutline 115 and another cut at cutline 145.

The example LED strip 100 includes two isolated power buses that each have an anode and a cathode with their associated contacts. Various implementations can include any number of isolated power buses, that may each have an anode conductor and a cathode conductor that run the length of the LED strip. The power buses are electrically isolated from each other with enough insulation and/or air spacing to meet appropriate safety standards. Example LED strip 100 has a first power bus that includes a first anode conductor 101 and a first cathode conductor 103 that both run the length of the LED strip 100 and a second power bus that includes a second anode conductor 102 and a second cathode conductor 104 that also both run the length of the LED strip 100. The first power bus and the second power bus of the LED strip 100 also include contact areas that straddle the cutlines on each of their conductors so that when the LED strip 100 is cut at a cutline, the contact areas are cut as well, leaving a contact area on each side of the cut that can be used to provide power to the separated sections of the LED strip 100.

In the example LED strip 100, the first anode conductor 101 is electrically connected to contact 111 on cutline 115, contact 121 that straddles cutline 125, contact 131 that straddles cutline 135, and contact 141 on cutline 145. The first cathode conductor 103 is electrically connected to contact 113 on cutline 115, contact 123 that straddles cutline 125, contact 133 that straddles cutline 135, and contact 143 on cutline 145. The second anode conductor 102 is electrically connected to contact 112 on cutline 115, contact 122 that straddles cutline 125, contact 132 that straddles cutline 135, and contact 142 on cutline 145. The second cathode conductor 104 is connected to contact 114 on cutline 115, contact 124 that straddles cutline 125, contact 134 that straddles cutline 135, and contact 144 on cutline 145. Note that because a contact straddles a cutline, it may be considered to be a pair of contacts, with one contact of the pair of contacts being on one section and the other contact of the pair of contacts being on the other section separated by the cutline. The LED strip 100 may be configured so that no conductors or other circuitry passes underneath the cutline other than the contacts and/or the conductors to which they are connected. This allows the LED strip 100 to be cut at a cutline 125, 135 without impacting the functionality of either section. In other implementations where the LED strip 100 may have multiple layers of conductors, the conductors may be arranged so that isolated conductors are not arranged at the same position at different layers on the cutline.

Each section of the example LED strip 100 includes two lighting circuits that each include one or more LEDs in any appropriate circuit configuration and may include other circuitry, such as a resistor to limit current. A lighting circuit may be integrated into a single package or may include multiple individual LED packages on a section of the LED strip 100. In some implementations, a lighting circuit may include multiple LEDs wired in series with a resistor, where the number of LEDs is based on their forward voltage drop and the target power voltage for the LED strip. So as a non-limiting example, if each LED in the lighting circuit has a forward voltage of 2.4 Volts (V) when 30 milliAmperes (mA) of current is flowing through the LED, a lighting circuit may include 9 LEDs and an 80 Ohm (Ω) resistor to limit current in case of a fault in one of the LEDs. In this example, if the input voltage to the lighting circuit is 24 Volts, the lighting circuit consumes 0.8 Watts (W) of power.

The first section 110 of the LED strip 100 includes a first lighting circuit 118 that includes a first LED, and a second lighting circuit 119 that includes a second LED. The first lighting circuit 118, and thus the first LED, is coupled between the first anode conductor 101 and the first cathode conductor 103 of the first power bus and the second lighting circuit 119, and thus the second LED, is coupled between the second anode conductor 102 and the second cathode conductor 104 of the second power bus. The second section 120 of the LED strip 100 includes a third lighting circuit 128 that includes a third LED, and a fourth lighting circuit 129 that includes a fourth LED. The lighting LED circuit 128, and thus the third LED, is coupled between the first anode conductor 101 and the first cathode conductor 103 of the first power bus and the fourth lighting circuit 129, and thus the fourth LED, is coupled between the second anode conductor 102 and the second cathode conductor 104 of the second power bus. The third section 130 of the LED strip 100 includes a fifth lighting circuit 138 that includes a fifth LED, and a sixth lighting circuit 139 that includes a sixth LED. The fifth lighting circuit 138, and thus the fifth LED, is coupled between the first anode conductor 101 and the first cathode conductor 103 of the first power bus and the sixth lighting circuit 139, and thus the sixth LED, is coupled between the second anode conductor 102 and the second cathode conductor 104 of the second power bus.

In the illustrated embodiment, the lighting system 199 includes the lighting strip 100, a first power supply 191 electrically connected to the first power bus, and a second power supply 192 electrically connected to the second power bus. The power supplies 191 and 192 may be implemented as LED drivers, which can be either current-regulated (constant current supplies) or voltage-regulated (constant voltage supplies), depending on the requirements of the lighting devices used in each power group. In some embodiments, the power supplies are configured to provide a regulated output—such as a fixed current suitable for driving series-connected LEDs, or a fixed voltage for parallel-connected LEDs or other lighting devices. The power supplies may further include circuitry to modulate the power delivered to the lighting strip, for example by employing pulse-width modulation (PWM), pulse-frequency modulation (PFM), or other modulation techniques to control the amount of power delivered to each power bus. Such modulation enables dimming, color mixing, or dynamic lighting effects, and may be controlled by an external controller, an addressing chip, or integrated control circuitry within the power supply itself. The outputs of the first power supply 191 and the second power supply 192 are electrically isolated from each other, ensuring that each power bus operates independently and in compliance with regulatory power limits. This arrangement allows the total power delivered to the lighting strip to exceed the limit for a single circuit, while maintaining safe operation and electrical isolation for each power group.

Using the example power discussed earlier, each section of the LED strip 100 would consume 1.6 W of power, 0.8 W each lighting circuit on the section. Because the first power bus is isolated from the second power bus, each power bus can be connected to an independent 96 W power supply which is compliant with NEC Class 2 standards. This allows an LED strip with 120 sections to be sold as a Class 2 device that does not require an electrician to install, even though the LED strip consumes 192 W of power. If, on the other hand, the LED strip used a single power bus (a common anode, a common cathode, or both) to power both lighting circuits on each section, as is common with legacy LED strips, an LED strip with a maximum of 60 sections could be sold as a Class 2 device.

4-pin and 6-pin connectors for 12 millimeter (mm) wide LED strip lighting are commonly available today, which would allow two or three isolated power buss to be provided to an LED strip. Wider LED strips and/or a finer pitch on the power contacts on the strip would allow for 4 or more isolated power buses to be provided to an LED strip. The LED strip may include any number of contacts (or pairs of contacts separated by the cutlines) at each cutline on the LED strip.

The first lighting circuit 118 and the second lighting circuit 119 may have the same spectral output or may have different spectral outputs, depending on the implementation. This applies to the third and fourth lighting circuits 128, 129, and the fifth and sixth lighting circuits 138, 139, as well. Providing the same spectral output from each of the lighting circuits means that their output can be controlled interchangeably. In at least one implementation, dimming below a certain level may be obtained by completely shutting off power to the first power bus and modulating power to the second power bus to achieve a desired level of dimming. In a different implementation, the first lighting circuit 118, third lighting circuit 128, and fifth lighting circuit 138 may produce warm white light (e.g., 2700K) and the second lighting circuit 119, fourth lighting circuit 129, and sixth lighting circuit 139 may produce cool white light (e.g., 6000K) and the relative power provided to the first and second power buss may be used to vary the color temperature of the LED strip 100.

Figure 2:
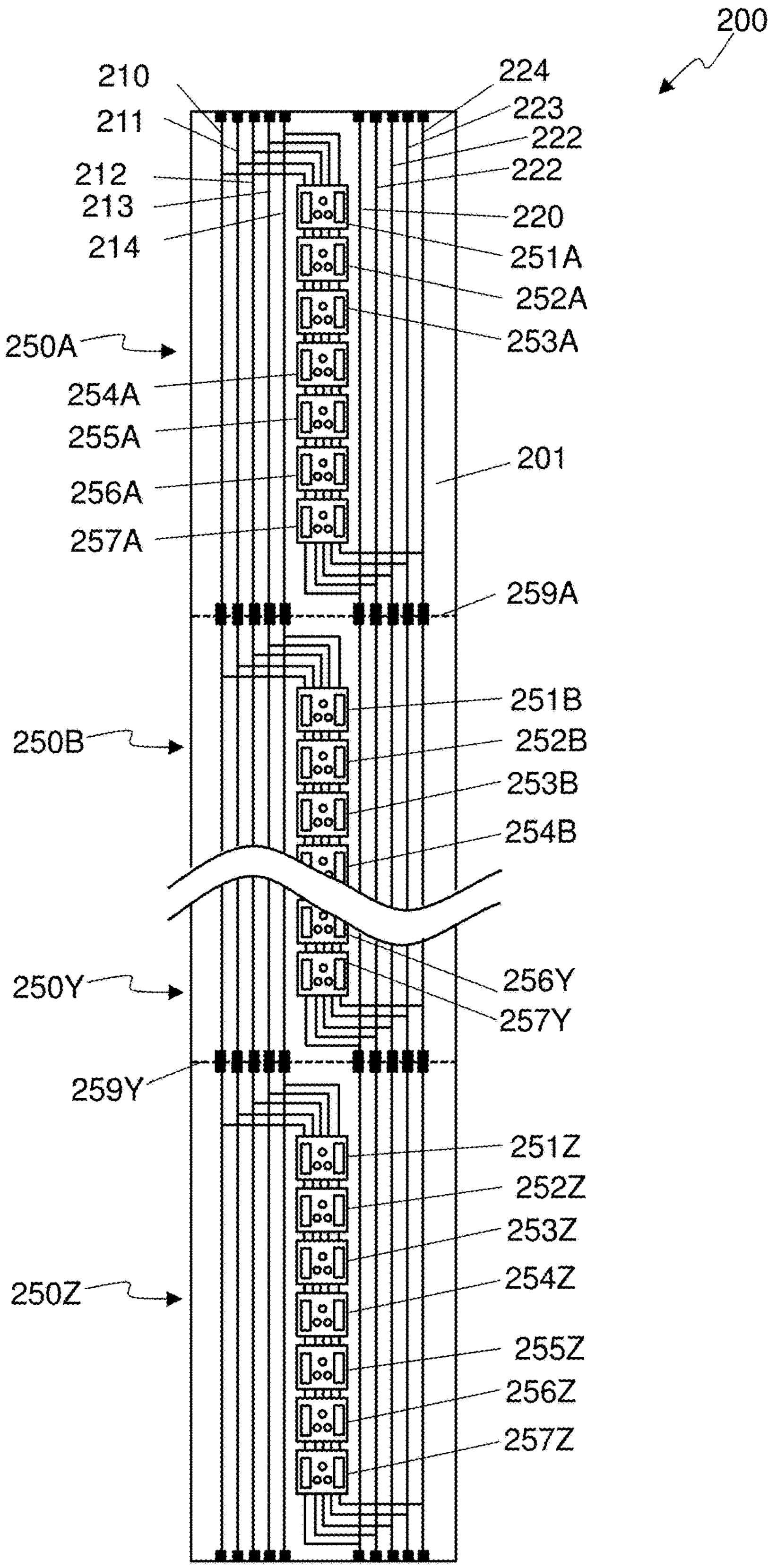
FIG. 2 shows an example of a lighting strip.

FIG. 2 illustrates a lighting strip 200 comprising a flexible, elongated printed circuit board (PCB) 201 that is divided into a plurality of sections, including a first section 250A, a second section 250B, an N-1th section 250Y, and an Nth section 250Z, where N can be any positive integer depending on the implementation and desired strip length. The PCB 201 supports a modular architecture, with each section separated by cutlines (e.g., 259A, 259Y) that allow for the strip to be separated into independently operable segments. Each section is configured to be electrically and mechanically distinct, supporting flexible installation, customization, and extension of the lighting strip.

Extending along the length of the PCB 201 are multiple anode conductors 210, 211, 212, 213, and 214, and corresponding cathode conductors 220, 221, 222, 223, and 224. Each anode/cathode conductor pair forms a power bus that is electrically isolated from the other power buses, enabling each group of lighting devices to be powered independently and in compliance with regulatory power limits. The conductors may be dimensioned to support high current capacity and are routed such that they pass through each section, maintaining electrical continuity until the strip is separated at a cutline. At each section boundary, the conductors are accessible for connection to external power sources or connectors, facilitating modularity and ease of reconfiguration.

Within each section, a plurality of multi-die LED packages are mounted, such as 251A, 252A, 253A, 254A, 255A, 256A, and 257A in the first section 250A, and corresponding packages (e.g., 251B, 252B, 253B, 254B, etc.) in subsequent sections. In one example implementation, each multi-die LED package may be a YUJILEDS YJ BC RGBWW 5050L G03, but any other suitable multi-die LED package may be used. Other implementations may use single LED packages or combinations of single LED packages and multi-die LED packages. Each such package includes five individual LEDs (for example, red, green, blue, warm white, and cool white), with each LED having its own dedicated anode and cathode connections. These separate connections are routed to the corresponding isolated power bus conductors, ensuring that each LED within the package is electrically isolated from the others and from other power groups on the strip. Thus, in this example, each LED die in a multi-die package is in a different power group. This configuration maintains strict isolation between power groups, allowing each group to be independently powered, dimmed, or controlled, and supporting compliance with safety and regulatory requirements for high-power operation.

In some implementations, particularly where each multi-die LED package includes red, green, and blue LEDs, the power delivered to each color channel may be separately varied by independently modulating the power supplied to the corresponding power group through its associated power bus. For example, as shown in FIG. 2, each red, green, and blue LED die within a multi-die LED package may be electrically coupled to its own isolated anode and cathode conductors, forming distinct power groups for each color. By independently adjusting the current or voltage supplied to each of these isolated power groups, the relative intensities of the red, green, and blue LEDs may be selectively controlled, enabling the generation of a wide variety of colors through additive color mixing. This approach allows for precise and dynamic color tuning across the lighting strip, supporting applications such as full-color displays, architectural lighting, and customizable ambient lighting.

This architecture stands in contrast to LED strips that use a common anode or common cathode configuration for multiple color channels. In such designs, the red, green, and blue LEDs for each segment share a single conductor for either the anode or cathode, with the other side of each LED connected to its own color-specific conductor. When current flows through one color channel, the shared conductor carries the combined current of all active channels. As a result, voltage drop along the shared conductor increases with the total current, especially over long strip lengths or at higher power levels. This voltage drop can cause the voltage available to each color channel to vary depending on the current drawn by the other channels, leading to unintended changes in the brightness or color output of the LEDs. For example, if the red channel draws significant current, the resulting voltage drop along the common anode or cathode may reduce the voltage available to the green and blue channels, causing their light output to decrease even if their intended drive current remains unchanged. This interdependence between channels can result in color shifting, uneven illumination, and reduced control fidelity, particularly in high-power or long-run installations.

By contrast, the use of electrically isolated anode and cathode conductors for each color channel in the present disclosure eliminates shared current paths and the associated voltage drop effects. Each color channel receives power through its own dedicated and isolated conductors, so changes in current or voltage for one channel do not impact the electrical conditions or light output of the other channels. This enables robust, predictable, and independent control of each color, supporting high-quality color mixing and consistent performance across the entire length of the lighting strip, regardless of total power draw or installation length.

So, in some implementations, the lighting strip may further include a third power bus comprising a third anode contact and a third cathode contact to receive third power, where the third power bus is electrically isolated from both the first power bus and the second power bus. In such implementations, a first blue LED in the first section and a second blue LED in the second section may be electrically coupled to the third power bus, while the first LED and second LED may be red LEDs and the third LED and fourth LED may be green LEDs. In these configurations, a first change in a first current flowing through the first power bus to the red LEDs may have no visible impact on light emitted by any of the green LEDs or blue LEDs, a second change in a second current flowing through the second power bus to the green LEDs may have no visible impact on light emitted by any of the red LEDs or blue LEDs, and a third change in a third current flowing through the third power bus to the blue LEDs may have no visible impact on light emitted by any of the red LEDs or green LEDs. This independent electrical isolation between the power buses enables each color channel or group to be modulated or controlled without affecting the output of the other channels, supporting robust and predictable color control and high-quality lighting effects.

The arrangement of conductors and LED packages in FIG. 2 enables each power group of the lighting strip 200 to be independently powered and controlled, with each anode/cathode pair isolated from others. This supports the modularity, scalability, and high-power operation described in the claims. The use of multi-die LED packages with isolated connections for each LED die further enhances the flexibility of the system, allowing for a wide range of color mixing, tunable white, or other advanced lighting effects, while maintaining robust electrical isolation and safe operation across the entire length of the strip, regardless of the number of sections N.

Figure 3:
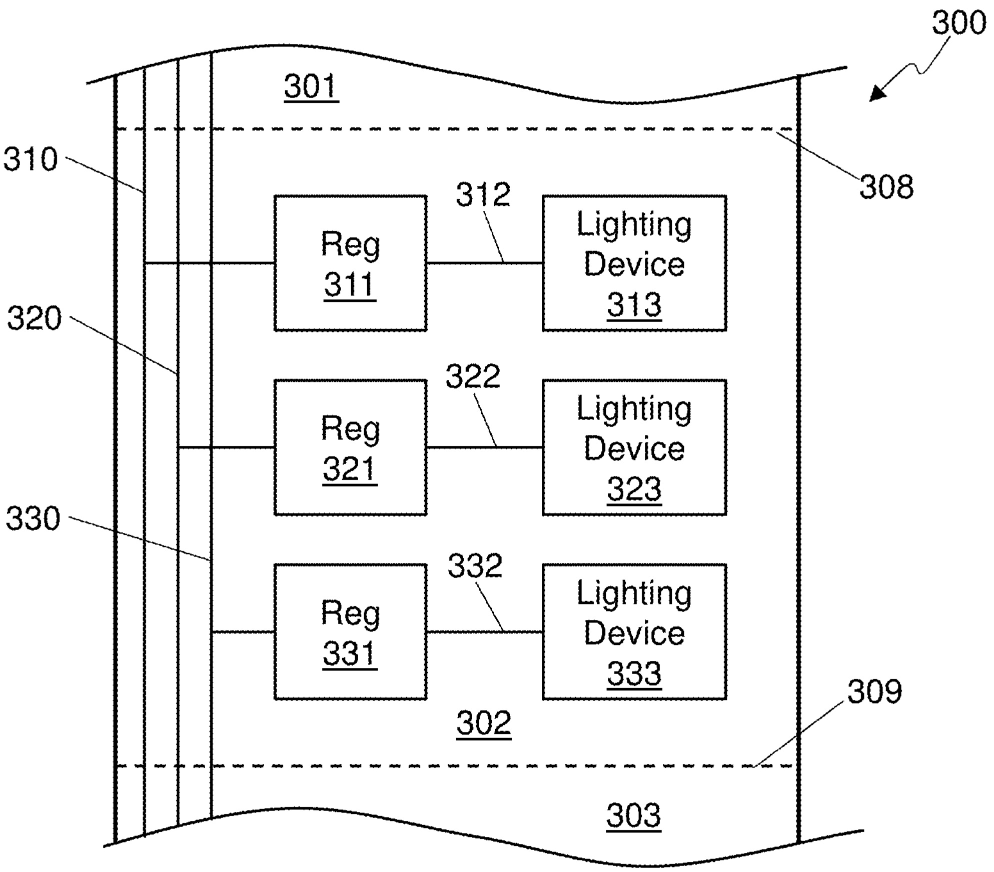
FIG. 3 shows a section of an example lighting strip having regulators.

FIG. 3 depicts a section of a lighting strip 300 having multiple sections, including a previous section 301, a current section 302, and a next section 303, separated by cutlines 308 and 309. The lighting strip 300 can have any number of sections depending on the implementation. The lighting strip 300 includes a first power bus 310, a second power bus 320, and a third power bus 330, each supplying power to a corresponding regulator circuit 311, 321, and 331, respectively. In some implementations, the regulators 311,321, 331 may be buck regulator circuits using an RT8250 controller chip and may support up to a 1.2 A output. Each regulator circuit is electrically coupled between its associated power bus and a respective lighting device—regulator circuit 311 provides regulated power 312 to lighting device 313, regulator circuit 321 provides regulated power 322 to lighting device 323, and regulator circuit 331 provides regulated power 332 to lighting device 333. It should be noted that, as used throughout this disclosure, a "power bus" includes at least an anode conductor and a cathode conductor, which together form an electrically isolated pair for delivering power to a group of lighting devices. In FIG. 3, each power bus 310, 320, and 330 is represented by a single line for clarity and to simplify the drawing; this representation is not intended to indicate that a power bus consists of only a single conductor. Rather, each power bus comprises at least two conductors (anode and cathode), and may include additional conductors or features as required by the specific implementation. The simplified depiction in FIG. 3 is for illustrative purposes only and does not limit the structure or number of conductors included in each power bus.

The inclusion of dedicated regulator circuits for each power bus and lighting device enables precise control of the electrical characteristics delivered to each lighting device, regardless of variations in input voltage or load conditions along the length of the strip. In some embodiments, the regulator circuits may be implemented as constant current regulators, constant voltage regulators, or programmable regulators, depending on the requirements of the lighting devices and the desired performance. For example, a linear regulator may be used for applications requiring low noise and simplicity, while a switching regulator (such as a buck or boost converter) may be selected for higher efficiency and improved thermal management in high-power or long-run installations. The regulator circuits may be realized as integrated circuits or as assemblies of discrete components, such as transistors, diodes, resistors, capacitors, and inductors, and may include features such as overcurrent protection, thermal shutdown, or dimming control.

In certain embodiments, the lighting strip is configured to operate at a higher supply voltage, such as 48 V or 60 V, which significantly reduces the current required in each power bus for a given power level. By reducing the current, resistive losses ($I^2R$ losses) in the conductors of the lighting strip are minimized, thereby improving the overall efficiency and enabling longer strip lengths without substantial voltage drop or uneven light output. Each power bus delivers the higher voltage to its respective section, where a dedicated regulator circuit—such as a linear or switching regulator—converts the supplied voltage to the specific voltage and/or current required by the lighting devices in that power group. This localized regulation ensures that each lighting device receives stable and appropriate power, regardless of variations in the supply voltage or the length of the strip. The use of higher voltage distribution combined with per-group per-section regulation not only enhances energy efficiency and thermal performance but also supports robust and uniform operation across extended or high-power lighting installations.

Figure 4:
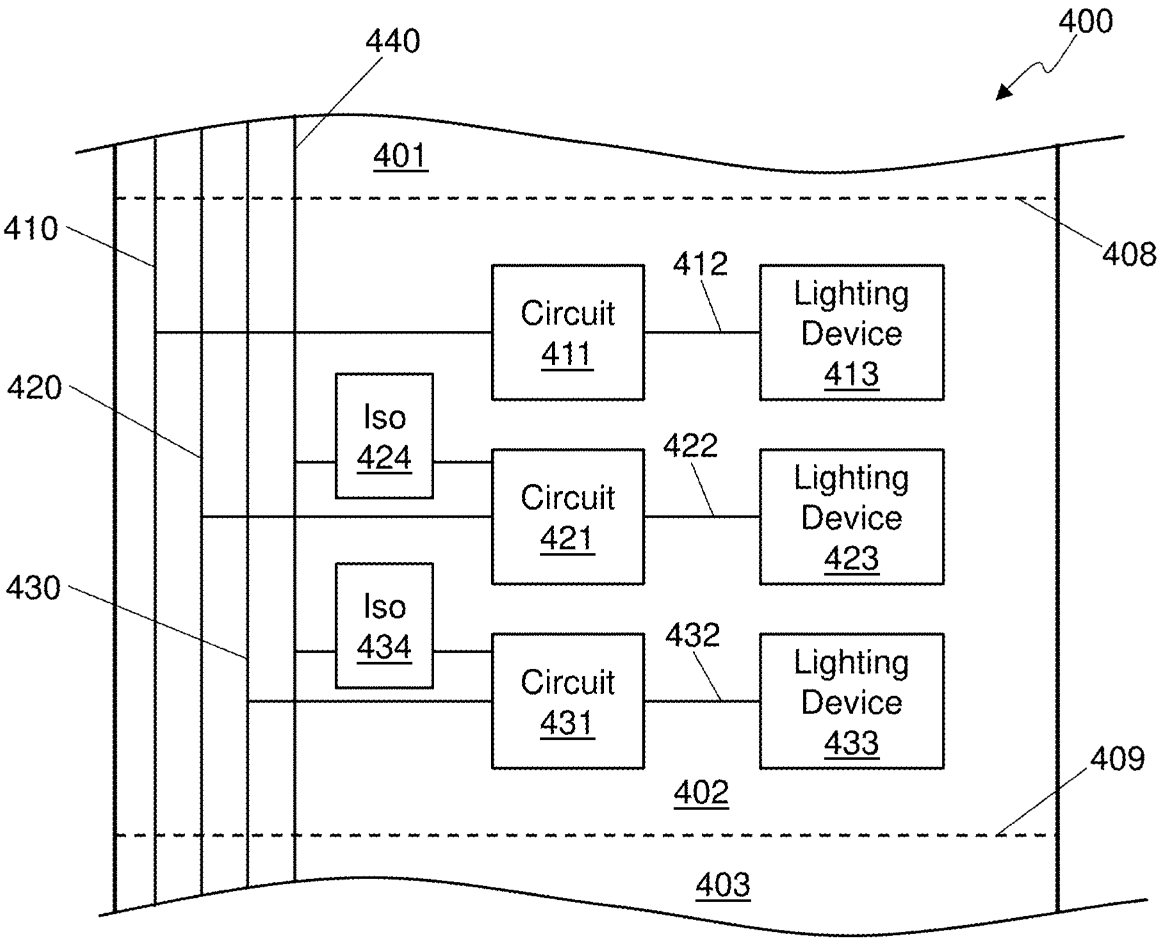
FIG. 4 shows a section of an example lighting strip with a common data input bus.

FIG. 4 illustrates a section of a lighting strip 400 comprising a previous section 401, a current section 402, and a next section 403, separated by cutlines 408 and 409. The lighting strip 400 can have any number of sections depending on the implementation. The lighting strip 400 includes a first power bus 410, a second power bus 420, and a third power bus 430, each extending continuously through the length of the strip to provide power to corresponding circuits in each section. In addition to the power buses, a data input 440 is provided and also extends along the length of the strip, serving as a common data pathway to each circuit in every section. In FIG. 4, each power bus 410, 420, 430 and the data input 440 is represented by a single line for clarity and to simplify the drawing; this representation is not intended to indicate that they consist of only a single conductor. Rather, each power bus 410, 420, 430 comprises at least two conductors (anode and cathode), and may include additional conductors or features as required by the specific implementation. Likewise, the data input 440 may include multiple conductors, such as a separate data and clock or other control signals and/or a reference ground. The simplified depiction in FIG. 4 is for illustrative purposes only and does not limit the structure or number of conductors included in each power bus 410, 420, 430 and/or data input 440.

The data input 440 in the example shown in FIG. 4 carries the same data signal to each circuit 411, 421, 431 in each section of the strip. In one example, the data input 440 may carry a signal compliant with the Digital Multiplex (DMX) standard for digital communication networks, which is entitled "Entertainment Technology—USITT DMX512-A—Asynchronous Serial Digital Data Transmission Standard for Controlling Lighting Equipment and Accessories." or another suitable digital lighting control protocol. Each circuit 411, 421, 431 in a given section may be assigned an address, which may be programmed during manufacture or configuration, and is configured to receive and decode data from the data input 440 based on its own address. This enables separate control of the circuits and their associated lighting devices within the strip, even though all circuits receive the same data stream. Depending on the implementation, each circuit in a power group may have the same address, with circuits in different power groups having different addresses, or each circuit may have its own address based on its power group and section. Other address assignment schemes are also envisioned.

To maintain electrical isolation between circuits powered by different power buses, isolation circuits such as opto-isolators 424 and 434 are provided between the data input 440 and the circuits 421 and 431, respectively. These isolation circuits 424, 434 ensure that the second circuit 421 and third circuit 431 are electrically isolated from the data input 440, and thus from each other and from the first circuit 411. In some implementations, the data input 440 may be in the same power group as the first power bus 410, eliminating the need to electrically isolate it from the first circuit 411 and allowing the cathode conductor of the first power bus 410 to serve as its reference, thereby reducing the required number of connections for the strip. In other implementations, the data input 440 may be electrically isolated from all power groups, with each circuit receiving data through its own isolation circuit. This flexible architecture supports a range of installation and safety requirements, while enabling robust, addressable, and modular lighting control throughout the length of the strip.

Each circuit 411, 421, 431 is configured to receive data from the data input 440 and, based on the received data, respectively generate modulated power 412, 422, 432 suitable for driving its associated lighting device 413, 423, 433. The modulated power 412, 422, 432 may be modulated with PWM, PFM, constant voltage regulation, constant current regulation, or any other type of digital or analog power regulation, depending on the implementation. The modulation of power in each circuit 411, 421, 431 may be independently controlled according to the data received, based on the circuit's address. This architecture allows for flexible and addressable lighting control, where each lighting device may be operated with a unique modulation profile, or brightness level as determined by the data stream provided to the data input 440, while maintaining robust electrical isolation and compliance with safety requirements.

In one implementation, the lighting devices 413, 423, 433 may have the same spectral output and all three power groups may be controlled as a single channel. Grouping all three power groups into a single channel allows for higher granularity of dimming, as lower levels of state-of-the-art LED drivers often struggle with dimming levels around 1-2%. Grouping would enable more granular dimming if controlled separately. For example, by using three 8-bit PWM drivers 411, 421, 431, that each power an equivalent lighting device 413, 423, 433, a 24-bit resolution for the dimming may be achieved.

Figure 5:
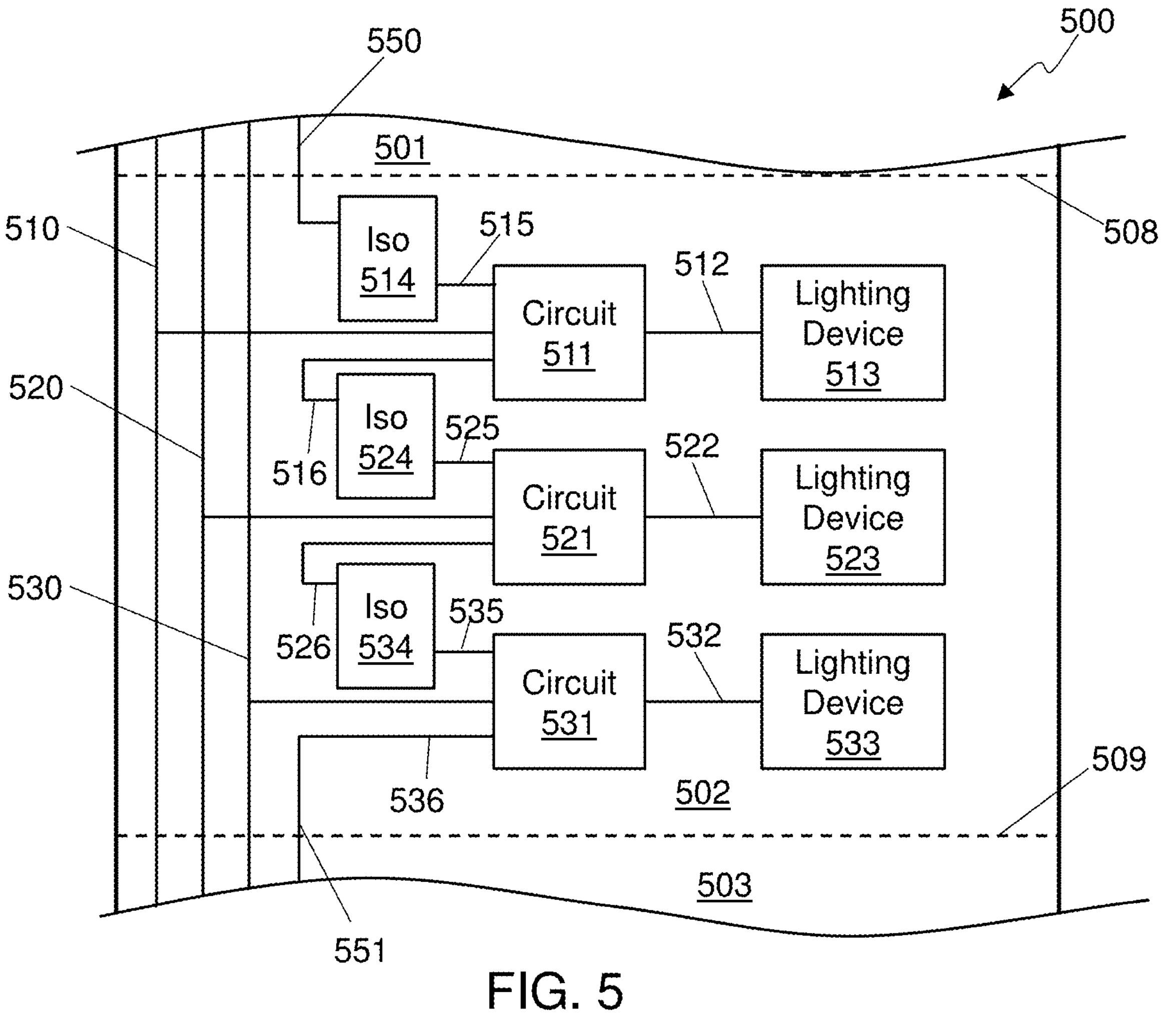
FIG. 5 shows a section of an example lighting strip with a daisy-chained data input.

FIG. 5 illustrates a section of a lighting strip 500 comprising a previous section 501, a current section 502, and a next section 503, separated by cutlines 508 and 509. The lighting strip 500 can have any number of sections depending on the implementation. The lighting strip 500 includes a first power bus 510, a second power bus 520, and a third power bus 530, each extending continuously through the length of the strip to provide power to corresponding circuits in each section. In addition to the power buses, a section data input 550 and a section data output 551 of the current section 502 are provided. In FIG. 5, each power bus 510, 520, 530 and other signals are represented by a single line for clarity and to simplify the drawing; this representation is not intended to indicate that they consist of only a single conductor. Rather, each power bus 510, 520, 530 comprises at least two conductors (anode and cathode), and may include additional conductors or features as required by the specific implementation. Likewise, other lines in FIG. 5, such as the section data input 550 and section data output 551 may include multiple conductors, such as a separate data and clock or other control signals and/or a reference ground. The simplified depiction in FIG. 5 is for illustrative purposes only and does not limit the structure or number of conductors included in each power bus 510, 520, 530 and/or signals shown.

The lighting strip 500 includes a daisy-chained data flow. Data is received at a section 502 through a section data input 550 from a first adjoining section 501 and sent to a second adjoining section 503 through a section data output 551, enabling sequential communication between adjoining sections. Within section 502, the section data input 550 may be received by a first isolation circuit 514, which provides a first data input 515 to a first circuit 511. The first circuit 511 may be configured to receive a plurality of data, such as first data, second data, third data, and fourth data, through the first data input 515, provide first modulated power 512 to a first lighting device 513 based on the first data, and send the remaining data (e.g., second data, third data, and fourth data) out through a first data output 516. The first data output 516 may be communicatively coupled to a second isolation circuit 524, which provides a second data input 525 to a second circuit 521. The second circuit 521 may receive the second data, third data, and fourth data, provide second modulated power 522 to a second lighting device 523 based on the second data, and send the third data and fourth data out through a second data output 526. The second data output 526 may be communicatively coupled to a third isolation circuit 534, which provides a third data input 535 to a third circuit 531. The third circuit 531 may receive the third data and fourth data, provide third modulated power 532 to a third lighting device 533 based on the third data, and send the fourth data out through a third data output 536. The third data output 536 may be routed to the section data output 551, which is accessible at the boundary of the section for connection to the next section 503. In this manner, the data input 550 of a section may receive a stream of data comprising control information for multiple circuits, and each circuit in the section may extract and act upon its respective data while passing the remaining data along the chain, with electrical isolation maintained between the power groups powered by different power buses 510, 520, 530. This daisy-chained data flow enables addressable and modular control of lighting devices across multiple sections, supporting scalable and flexible lighting system architectures.

In one example, the section data input 550 may carry a signal compliant with control data signal input of the WS2811, Signal line 256 Gray level 3 channel Constant current LED drive IC, although any type of communication protocol may be used in other implementations. The WS2811 datasheet from Worldsemi is incorporated by reference herein. The section data input 550 may be a single serial input line referenced to a cathode conductor of the first power bus 510, or may have a separate reference ground. It may may use the single NZR communication mode described in the WS2812B datasheet. The end of a reset pulse identifies the start of a stream of data. Each circuit 511, 521, 531 strips off the first 24 bits of data it receives, and, based on that data, respectively generate modulated power 512, 522, 532 suitable for driving its associated lighting device 513, 523, 533. It then passed the rest of the received data to its output, which goes to the next circuit in the daisy-chain. The modulated power 512, 522, 532 may be modulated with PWM, PFM, constant voltage regulation, constant current regulation, or any other type of digital or analog power regulation, depending on the implementation.

Figure 6:
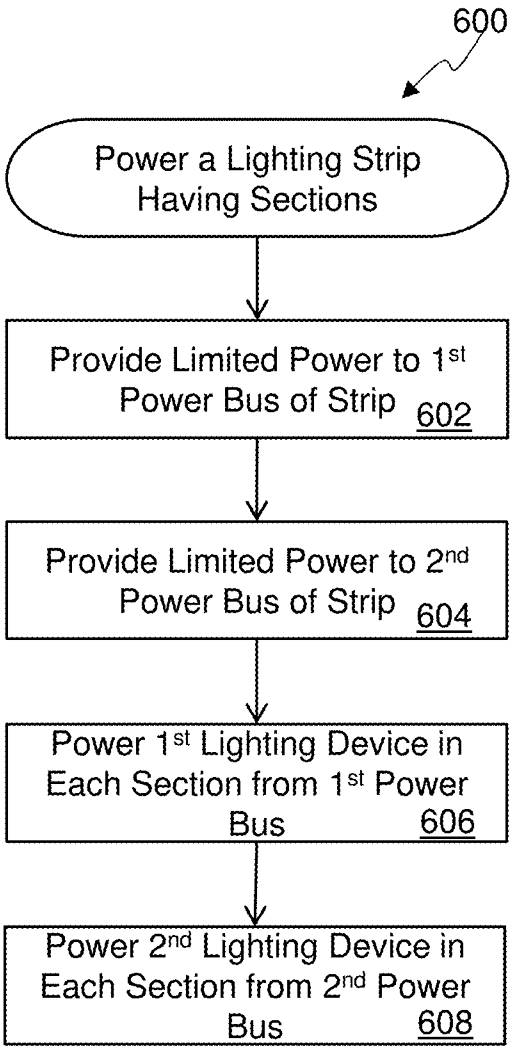
FIG. 6 illustrates a flowchart of a method to power a lighting strip.

FIG. 6 illustrates a flowchart 600 detailing a method for powering a modular lighting strip comprising multiple sections separated by cutlines. The method begins with the step of providing limited power to a first power bus of the lighting strip, as shown in step 602. In this step, the first power bus is supplied with electrical power that is limited to a maximum value, such as no more than 100 W and no more than 60 V, to ensure compliance with safety and regulatory requirements. The first power bus typically comprises a first anode conductor and a first cathode conductor extending along the length of the strip, and the power is provided via contacts positioned on the exterior surface of the strip, for example at a first end of the strip.

In step 604, limited power is provided to a second power bus of the lighting strip. The second power bus is electrically isolated from the first power bus and is also supplied with power limited to a maximum value, such as no more than 100 W and no more than 60 V. The second power bus includes a second anode conductor and a second cathode conductor, and power is provided via corresponding contacts on the exterior surface of the strip. The electrical isolation between the first and second power buses allows the total power drawn by the strip to exceed the limit for a single circuit, while ensuring that no individual power bus exceeds the regulatory threshold.

Step 606 involves powering a first lighting device in each section of the lighting strip from the first power bus. Each section of the strip includes at least one lighting device, such as an LED, that is electrically coupled between the first anode conductor and the first cathode conductor of the first power bus. The first lighting device in each section receives power from the first power bus, enabling independent operation and control of the lighting devices across the strip. In some embodiments, the first lighting device may be a specific color or type of LED, or may be part of a multi-die LED package.

In step 608, a second lighting device in each section is powered from the second power bus. The second lighting device is electrically coupled between the second anode conductor and the second cathode conductor of the second power bus, and is isolated from the first power bus. This arrangement allows for independent control and operation of the second lighting device in each section, and supports configurations where the first and second lighting devices have different spectral characteristics, such as different colors or different correlated color temperatures.

The method may further include providing the first and second power to respective anode and cathode contacts positioned on the exterior surface of the strip at a first end or at each section boundary, enabling flexible installation and modularity. The lighting strip may comprise a flexible, elongated printed circuit board (PCB) divided into a plurality of sections by cutlines extending across the width of the PCB, with each section supporting independently operable lighting devices after separation at a cutline.

In some implementations, the method includes providing additional lighting devices in each section, so that the total power drawn by the strip during operation is over 100 W, but the power drawn through each anode conductor remains less than 100 W. The method may also include providing regulated power to each lighting device via a power regulator in each section, converting the input power to a regulated output voltage or current suitable for the lighting device.

For addressable lighting strips, the method may further comprise providing data to a data input of the strip, receiving data at circuits in each section, and modulating the power delivered to each lighting device based on the received data. Electrical isolation between the data input and certain circuits may be achieved using opto-isolators or other isolation circuits. The method may also include sequential data communication between sections, with each circuit receiving, processing, and forwarding data as needed, while maintaining electrical isolation between circuits powered by different power buses.

The method supports independent modulation of the first and second power to control the light output of the strip, including dimming and color mixing. For example, the first and second lighting devices in each section may emit light with a common spectral characteristic, or may emit light with different spectral characteristics, such as different colors or different correlated color temperatures, enabling tunable white or color-changing effects. The method may also include turning off one power bus and modulating the other to achieve a desired output brightness or color.

Overall, FIG. 6 and the described method enable safe, modular, and flexible powering and control of lighting strips with multiple isolated power buses, supporting high total power, compliance with safety standards, and advanced lighting effects through independent control of lighting devices in each section.

It should be understood that the steps described herein, including those illustrated in the flowchart of FIG. 6 and elsewhere in this disclosure, may be performed in any suitable order and/or may be performed simultaneously, unless a particular sequence is explicitly required. The order of operations may be varied to suit specific implementations, and steps may be combined, omitted, or executed in parallel as appropriate for the desired application or system configuration.

Across all figures, lighting strips are constructed to support modularity, high-power operation, and compliance with safety standards. Each section is independently powered and controlled, with isolated anode/cathode pairs, accessible contacts at section boundaries, and arrangements for both non-addressable and addressable LED configurations. Regulator circuits, opto-isolators, isolation circuits, and data conductors support a wide range of lighting applications and control options, while maintaining electrical isolation and safety. The modular design, with cutlines and accessible contacts, enables easy customization, extension, and reconfiguration of the lighting strips, ensuring robust and versatile operation.

Operation of the disclosed modular lighting strip may be understood as follows. The lighting strip may be constructed as a flexible, elongated printed circuit board (PCB) divided into a plurality of sections by cutlines, with each section comprising at least one lighting device, such as an LED, and associated circuitry. Each section may be electrically and mechanically distinct, supporting independent operation after separation at a cutline. Power is distributed along the length of the strip via multiple power buses, each comprising an isolated anode conductor and cathode conductor pair. These power buses may extend continuously through all sections, with accessible contacts provided at each section boundary and at the ends of the strip to facilitate connection to power supplies or connectors.

Each lighting device in a section may be electrically coupled between the anode and cathode conductors of a corresponding power bus, with each power bus isolated from the others to ensure independent current paths and compliance with regulatory power limits. For example, a first lighting device in each section may be powered from a first power bus, while a second lighting device in each section may be powered from a second power bus, and so on for additional power buses and lighting devices. The number of power buses and lighting devices per section may be selected based on the desired configuration, total power requirements, and regulatory constraints.

Power may be supplied to each power bus via dedicated power supplies, which may be configured to provide regulated voltage or current as appropriate for the lighting devices used. The outputs of the power supplies may be electrically isolated from each other, ensuring that each power bus operates independently and that the total power delivered to the strip may exceed the limit for a single circuit, while maintaining safe operation for each group. In some embodiments, each power group within a section may include a dedicated power regulator, such as a linear or switching regulator, to provide stable and consistent power to the lighting device(s) in that group, regardless of variations in input voltage or load conditions.

The modularity of the strip is enabled by the arrangement of cutlines and accessible contacts at each section boundary. When the strip is separated at a cutline, the contacts on each side of the cutline remain accessible for connection to external power sources or connectors, allowing the separated sections to be independently powered and operated. This supports flexible installation, customization, and extension of the lighting strip, as well as compliance with safety standards for modular lighting systems.

In addressable lighting strip implementations, each section or power group may include a circuit, such as an addressing chip, configured to receive data signals via a data conductor and to modulate the power delivered to the associated lighting device(s) based on the received data. Data conductors may extend along the length of the strip to distribute data to each addressing chip in parallel, with additional contacts provided at each section boundary as needed. Electrical isolation between data conductors and circuits powered by different power buses may be maintained using isolation circuits, such as opto-isolators, to ensure robust and safe operation. Alternatively, data may be distributed to each section in a daisy-chained fashion, with each circuit extracting and acting upon its respective data while passing remaining data along the chain.

The lighting devices in each section may be configured to emit light with common or different spectral characteristics, such as different colors or correlated color temperatures, enabling a wide range of lighting effects, including tunable white, color mixing, and dynamic modulation. The power delivered to each lighting device may be independently modulated, for example using pulse-width modulation (PWM) or other techniques, to achieve the desired brightness, color, or effect.

The method of operation may include providing limited power to each power bus, powering the corresponding lighting devices in each section from their respective power buses, and, in addressable implementations, providing data to the circuits in each section to control the modulation of power and light output. The modular design, with isolated power buses, accessible contacts, and support for both non-addressable and addressable configurations, enables safe, flexible, and scalable lighting solutions suitable for a wide range of applications.

As used in this specification and the appended claims, the singular forms "a", "an", and "the" include plural referents unless the content clearly dictates otherwise. Furthermore, as used in this specification and the appended claims, the term "or" is generally employed in its sense including "and/or" unless the content clearly dictates otherwise. As used herein, the term "coupled" includes direct and indirect connections. Moreover, where first and second devices are coupled, intervening devices including active devices may be located there between.

Examples of various embodiments are described in the following paragraphs:

Example 1. An LED lighting strip comprising: two or more sections including a first section and a second section divided by a cutline; a first power bus comprising a first anode contact and a first cathode contact to receive first power; a second power bus comprising a second anode contact and a second cathode contact to receive second power, the second power bus electrically isolated from the first power bus; a first LED in the first section electrically coupled to the first power bus; a second LED in the first section electrically coupled to the second power bus; a third LED in the second section electrically coupled to the first power bus; and a fourth LED in the second section electrically coupled to the second power bus.

Example 2. The LED lighting strip of example 1, further comprising additional sections having respective LEDs coupled to first power bus and the second power bus so that a total power drawn by the LED lighting strip is over 100 W but the first power drawn through the first power bus is less than 100 W and the second power drawn through the second power bus is less than 100 W.

Example 3. The LED lighting strip of any previous example, wherein the first LED, the second LED, the third LED, and the fourth LED all emit light with common spectral characteristic.

Example 4. The LED lighting strip of any previous example, wherein the first LED and the third LED emit light with a first spectral characteristic and the second LED and the fourth LED emit light with a second spectral characteristic.

Example 5. The LED lighting strip of example 4, wherein the first spectral characteristic has a first correlated color temperature and the second spectral characteristic has a second correlated color temperature.

Example 6. The LED lighting strip of example 4, wherein the first spectral characteristic has a first peak output having a first color and the second spectral characteristic has a second peak output having a second color.

Example 7. The LED lighting strip of any previous example, further comprising: a first power regulator in the first section, electrically coupled to the first power bus and configured to provide first regulated power to the first LED; a second power regulator in the first section, electrically coupled to the second power bus and configured to provide second regulated power to the second LED; a third power regulator in the second section, electrically coupled to the first power bus and configured to provide third regulated power to the third LED; and a fourth power regulator in the second section, electrically coupled to the second power bus and configured to provide fourth regulated power to the fourth LED.

Example 8. The LED lighting strip of any previous example, further comprising: a strip data input; a first circuit in the first section electrically coupled to the first power bus and configured to receive first data from the strip data input and provide first modulated power to the first LED based on the first data; a second circuit in the first section electrically coupled to the second power bus and electrically isolated from the strip data input, configured to receive second data from the strip data input and to provide second modulated power to the second LED based on the second data; a third circuit in the second section electrically coupled to the first power bus and configured to receive third data from the strip data input and provide third modulated power to the third LED based on the third data; and a fourth circuit in the second section electrically coupled to the second power bus and electrically isolated from the strip data input, configured to receive fourth data from the strip data input and to provide fourth modulated power to the fourth LED based on the fourth data.

Example 9. The LED lighting strip of example 8, further comprising an opto-isolator configured to galvanically isolate the second circuit from the strip data input.

Example 10. The LED lighting strip of any of examples 1-7, further comprising: a strip data input; a first circuit in the first section having a first data input and a first data output, the first data input coupled to the strip data input, the first circuit coupled to the first power bus and configured to receive first data, second data, third data, and fourth data through the first data input, provide first modulated power to the first LED based on the first data, and send the second data, the third data, and the fourth data out through the first data output; a second circuit in the first section having a second data input and a second data output, the second data input communicatively coupled to the first data output, the second circuit coupled to the second power bus and configured to receive the second data, the third data, and the fourth data through the second data input, provide second modulated power to the second LED based on the second data, and send the third data and the fourth data out through the second data output; a third circuit in the second section having a third data input and a third data output, the third data input communicatively coupled to the second data output, the third circuit coupled to the first power bus and configured to receive the third data and the fourth data through the third data input, provide third modulated power to the third LED based on the third data, and send the fourth data out through the third data output; and a fourth circuit in the second section having a fourth data input and a fourth data output, the fourth data input communicatively coupled to the third data output, the fourth circuit coupled to the second power bus and configured to receive the fourth data through the third data input, and provide fourth modulated power to the fourth LED based on the fourth data; wherein the first data output is electrically isolated from the second circuit; the second data output is electrically isolated from the third circuit; and the third data output is electrically isolated from the fourth circuit.

Example 11. The LED lighting strip of any previous example, further comprising: a third power bus comprising a third anode contact and a third cathode contact to receive third power, the third power bus electrically isolated from the first power bus and the second power bus; and a first blue LED in the first section and a second blue LED in the second section electrically coupled to the third power bus; wherein the first LED comprises a first red LED, the second LED comprises a second red LED, the third LED comprises a first green LED, and the fourth LED comprises a second green LED; whereby a first change in a first current flowing through the first power bus to the first red LED and the second red LED has no visible impact on light emitted by any of the first green LED, the second green LED, the first blue LED, or the second blue LED; whereby a second change in a second current flowing through the second power bus to the first green LED and the second green LED has no visible impact on light emitted by any of the first red LED, the second red LED, the first blue LED, or the second blue LED; and whereby a third change in a third current flowing through the third power bus to the first blue LED and the second blue LED has no visible impact on light emitted by any of the first red LED, the second red LED, the first green LED, or the second green LED.

Example 12. A lighting system comprising: a flexible, elongated printed circuit board (PCB) having a width that is perpendicular to a length of the PCB, the PCB divided into a plurality of sections by cutlines extending across the width of the PCB; a first anode conductor and a first cathode conductor, affixed to the PCB, extending along the length of the PCB, passing through the plurality of sections, and crossing the cutlines; a second anode conductor and a second cathode conductor, both electrically isolated from the first anode conductor and the first cathode conductor, affixed to the PCB, extending along the length of the PCB, passing through the plurality of sections, and crossing the cutlines; a first lighting device affixed to the PCB in a first section of the plurality of sections and electrically coupled between the first anode conductor and the first cathode conductor; a second lighting device affixed to the PCB in the first section and electrically coupled between the second anode conductor and the second cathode conductor; a third lighting device affixed to the PCB in a second section of the plurality of sections and electrically coupled between the first anode conductor and the first cathode conductor; and a fourth lighting device affixed to the PCB in the second section and electrically coupled between the second anode conductor and the second cathode conductor.

Example 13. The lighting system of example 12, further comprising: a first cutline, of the cutlines, that separates the first section from the second section; a first contact on an exterior surface of the PCB in the first section and electrically connected to the first anode conductor; a second contact on the exterior surface of the PCB in the second section and electrically connected to the first anode conductor; a third contact on the exterior surface of the PCB in the first section and electrically connected to the first cathode conductor; a fourth contact on the exterior surface of the PCB in the second section and electrically connected to the first cathode conductor; a fifth contact on the exterior surface of the PCB in the first section and electrically connected to the second anode conductor; a sixth contact on the exterior surface of the PCB in the second section and electrically connected to the second anode conductor; a seventh contact on the exterior surface of the PCB in the first section and electrically connected to the second cathode conductor; and a eighth contact on the exterior surface of the PCB in the second section and electrically connected to the second cathode conductor; wherein the first section and the second section are independently operable after the PCB is separated at the first cutline.

Example 14. The lighting system of any of examples 12-13, further comprising visible markings on the PCB denoting locations of the cutlines.

Example 15. The lighting system of any of examples 12-14, wherein the first lighting device, the second lighting device, the third lighting device, and the fourth lighting device respectively comprise at least one light emitting diode (LED).

Example 16. The lighting system of any of examples 12-15, further comprising: a first power supply coupled to the first anode conductor and the first cathode conductor and configured to provide a first power of no more than 100 W of power at no more than 60 V; and a second power supply coupled to the second anode conductor and the second cathode conductor and configured to provide a second power of no more than 100 W of power at no more than 60 V; wherein outputs of the first power supply are galvanically isolated from outputs of the second power supply; and a sum of the first power and the second power is greater than 100 W.

Example 17. The lighting system of any of examples 12-16, further comprising additional lighting devices affixed to other sections of the PCB so that a total power drawn by the PCB during operation is over 100 W but a first power drawn through the first anode conductor is less than 100 W and a second power drawn through the second anode conductor is less than 100 W.

Example 18. The lighting system of any of examples 12-17, further comprising: a first power regulator affixed to the PCB in the first section, electrically coupled between the first anode conductor and the first cathode conductor and configured to provide first regulated power to the first lighting device; a second power regulator affixed to the PCB in the first section, electrically coupled between the second anode conductor and the second cathode conductor and configured to provide second regulated power to the second lighting device; a third power regulator affixed to the PCB in the second section, electrically coupled between the first anode conductor and the first cathode conductor and configured to provide third regulated power to the third lighting device; and a fourth power regulator affixed to the PCB in the second section, electrically coupled between the second anode conductor and the second cathode conductor and configured to provide fourth regulated power to the fourth lighting device.

Example 19. The lighting system of any of examples 12-18, further comprising: a data input conductor affixed to the PCB; a first circuit affixed to the first section of the PCB, communicatively coupled to the data input conductor, electrically connected to the first anode conductor and the first cathode conductor, and configured to receive first data from the data input conductor and to provide first modulated power to the first lighting device based on the first data; a second circuit affixed to the first section of the PCB, communicatively coupled to and galvanically isolated from the data input conductor, electrically connected to the second anode conductor and the second cathode conductor, and configured to receive second data from the data input conductor and to provide second modulated power to the second lighting device based on the second data; a third circuit affixed to the second section of the PCB, communicatively coupled to the data input conductor, electrically connected to the first anode conductor and the first cathode conductor, and configured to receive third data from the data input conductor and to provide third modulated power to the third lighting device based on the third data; and a fourth circuit affixed to the second section of the PCB, communicatively coupled to and galvanically isolated from the data input conductor, electrically connected to the second anode conductor and the second cathode conductor, and configured to receive fourth data from the data input conductor and to provide fourth modulated power to the fourth lighting device based on the fourth data.

Example 20. The lighting system of example 19, further comprising an opto-isolator configured to galvanically isolate the second circuit from the data input conductor.

Example 21. The lighting system of example 19 or 20, further comprising: a first data input and a first data output of the first circuit, the first data input coupled to the data input conductor, the first circuit configured to receive the first data, the second data, the third data, and the fourth data through the first data input, and send the second data, the third data, and the fourth data out through the first data output; a second data input and a second data output of the second circuit, the second data input communicatively coupled to the first data output, the second circuit configured to receive the second data, the third data, and the fourth data through the second data input, and send the third data and the fourth data out through the second data output; a third data input and a third data output of the third circuit, the third data input communicatively coupled to the second data output, the third circuit configured to receive the third data and the fourth data through the third data input, and send the fourth data out through the third data output; and a fourth data input of the fourth circuit, the fourth data input communicatively coupled to the third data output, the fourth circuit configured to receive the fourth data; wherein the first data output is electrically isolated from the second circuit; the second data output is electrically isolated from the third circuit; and the third data output is electrically isolated from the fourth circuit.

Example 22. The lighting system of any of examples 12-21, wherein the first lighting device, the second lighting device, the third lighting device, and the fourth lighting device all emit light with a common spectral characteristic.

Example 23. The lighting system of any of examples 12-22, wherein the first lighting device and the third lighting device emit light with a first spectral characteristic and the second lighting device and the fourth lighting device emit light with a second spectral characteristic.

Example 24. The lighting system of example 23, wherein the first spectral characteristic has a first correlated color temperature and the second spectral characteristic has a second correlated color temperature.

Example 25. The lighting system of example 23, wherein the first spectral characteristic has a first peak output having a first color and the second spectral characteristic has a second peak output having a second color.

Example 26. The lighting system of any of examples 12-25, further comprising: a third anode conductor and a third cathode conductor, both electrically isolated from the first anode conductor, the second anode conductor, the first cathode conductor, and the second cathode conductor, affixed to the PCB, extending along the length of the PCB, passing through the plurality of sections, and crossing the cutlines; a first blue lighting device affixed to the PCB in the first section of the plurality of sections and electrically coupled between the third anode conductor and the third cathode conductor; and a second blue lighting device affixed to the PCB in the second section and electrically coupled between the third anode conductor and the third cathode conductor; wherein the first lighting device comprises a first red lighting device, the second lighting device comprises a second red lighting device, the third lighting device comprises a first green lighting device, and the fourth lighting device comprises a second green lighting device; whereby a first change in a first current flowing through the first anode conductor to the first red lighting device and the second red lighting device has no visible impact on light emitted by any of the first green lighting device, the second green lighting device, the first blue lighting device, or the second blue lighting device; whereby a second change in a second current flowing through the second anode conductor to the first green lighting device and the second green lighting device has no visible impact on light emitted by any of the first red lighting device, the second red lighting device, the first blue lighting device, or the second blue lighting device; and whereby a third change in a third current flowing through the third anode conductor to the first blue lighting device and the second blue lighting device has no visible impact on light emitted by any of the first red lighting device, the second red lighting device, the first green lighting device, or the second green lighting device.

Example 27. A method to power a lighting strip, the method comprising: providing first power to a first power bus of a lighting strip, the lighting strip having a plurality of sections separated by cutlines, the first power limited to no more than 100 W and no more than 60 V; providing second power to a second power bus of the lighting strip, the second power bus electrically isolated from the first power bus, the second power limited to no more than 100 W and no more than 60 V; powering a first lighting device in a first section of the plurality of sections of the lighting strip from the first power bus; powering a second lighting device in the first section of the lighting strip from the second power bus; powering a third lighting device in a second section of the plurality of sections of the lighting strip from the first power bus; and powering a fourth lighting device in the second section of the lighting strip from the second power bus.

Example 28. The method of example 27, further comprising: providing the first power to a first anode contact and a first cathode contact of the first power bus, the first anode contact and the first cathode contact positioned on an exterior surface of the first section of the lighting strip at a first end of the lighting strip; and providing the second power to a second anode contact and a second cathode contact of the second power bus, the second anode contact and the second cathode contact positioned on the exterior surface of the first section of the lighting strip at the first end of the lighting strip; wherein the lighting strip comprises a flexible, elongated printed circuit board (PCB) having a width that is perpendicular to a length of the PCB, the PCB divided into the plurality of sections by the cutlines which extend across the width of the PCB; and the first lighting device, the second lighting device, the third lighting device, and the fourth lighting device are affixed to the PCB.

Example 29. The method of any of examples 27-28, wherein the first lighting device, the second lighting device, the third lighting device, and the fourth lighting device respectively comprise at least one light emitting diode (LED).

Example 30. The method of any of examples 27-29, further comprising: independently modulating the first power and the second power to control a light output of the lighting strip.

Example 31. The method of any of examples 27-30, further comprising: turning off the first power and modulating the second power to set a light output of the lighting strip to an output brightness below a designated brightness level.

Example 32. The method of any of examples 27-30, wherein the first lighting device, the second lighting device, the third lighting device, and the fourth lighting device all emit light with a common spectral characteristic.

Example 33. The method of any of examples 27-32, wherein the first lighting device and the third lighting device emit light with a first spectral characteristic and the second lighting device and the fourth lighting device emit light with a second spectral characteristic.

Example 34. The method of example 33, wherein the first spectral characteristic has a first correlated color temperature and the second spectral characteristic has a second correlated color temperature.

Example 35. The method of any of examples 27-34, wherein a sum of the first power and the second power is greater than 100 W.

Example 36. The method of any of examples 27-35, further comprising: providing the first power at a first input voltage; providing the second power at a second input voltage; converting the first power to a first regulated power at a first output voltage by a first power regulator in the first section; providing the first regulated power to the first lighting device; converting the second power to a second regulated power at a second output voltage by a second power regulator in the first section; providing the second regulated power to the second lighting device; converting the first power to a third regulated power at a third output voltage by a third power regulator in the second section; providing the third regulated power to the third lighting device; converting the second power to a fourth regulated power at a fourth output voltage by a fourth power regulator in the second section; and providing the fourth regulated power to the fourth lighting device.

Example 37. The method of any of examples 27-36, further comprising: providing first data, second data, third data, and fourth data to a data input of the lighting strip; receiving the first data at a first circuit in the first section, the first circuit electrically coupled to the first power bus and configured to provide first modulated power to the first lighting device based on the first data; receiving the second data at a second circuit in the first section, the second circuit electrically coupled to the second power bus and configured to provide second modulated power to the second lighting device based on the second data; receiving the third data at a third circuit in the second section, the third circuit electrically coupled to the first power bus and configured to provide third modulated power to the third lighting device based on the third data; and receiving the fourth data at a fourth circuit in the second section, the fourth circuit electrically coupled to the second power bus and configured to provide fourth modulated power to the fourth lighting device based on the fourth data; wherein the second circuit and the fourth circuit are electrically isolated from the data input.

Example 38. The method of example 37, further comprising electrically isolating the second circuit from the data input using an opto-isolator.

Example 39. The method of examples 27-36, further comprising: providing first data, second data, third data, and fourth data to a data input of the lighting strip; receiving the first data, the second data, the third data, and the fourth data from the data input of the lighting strip through a first data input of a first circuit in the first section, the first circuit electrically coupled to the first power bus and configured to provide first modulated power to the first lighting device based on the first data and send the second data, the third data, and the fourth data out through a first data output of the first circuit; receiving the second data, the third data, and the fourth data from the first data output through a second data input of a second circuit in the first section, the second circuit electrically coupled to the second power bus and configured to provide second modulated power to the second lighting device based on the second data and send the third data, and the fourth data out through a second data output of the second circuit; receiving the third data and the fourth data from the second data output through a third data input of a third circuit in the second section, the third circuit electrically coupled to the first power bus and configured to provide third modulated power to the third lighting device based on the third data and send the fourth data out through a third data output of the third circuit; and receiving the fourth data from the third data output through a fourth data input of a fourth circuit in the second section, the fourth circuit electrically coupled to the second power bus and configured to provide fourth modulated power to the fourth lighting device based on the fourth data; wherein the first data output is electrically isolated from the second circuit; the second data output is electrically isolated from the third circuit; and the third data output is electrically isolated from the fourth circuit.

Example 40. The method of examples 27-39, further comprising: providing third power to a third power bus of the lighting strip, the third power bus electrically isolated from the first power bus and the second power bus, the third power limited to no more than 100 W and no more than 60 V; powering a first blue lighting device in the first section of the plurality of sections of the lighting strip from the third power bus; and powering a second blue lighting device in the second section of the lighting strip from the third power bus; wherein the first lighting device comprises a first red lighting device, the second lighting device comprises a second red lighting device, the third lighting device comprises a first green lighting device, and the fourth lighting device comprises a second green lighting device; whereby a first change in a first current flowing through the first power bus to the first red lighting device and the second red lighting device has no visible impact on light emitted by any of the first green lighting device, the second green lighting device, the first blue lighting device, or the second blue lighting device; whereby a second change in a second current flowing through the second power bus to the first green lighting device and the second green lighting device has no visible impact on light emitted by any of the first red lighting device, the second red lighting device, the first blue lighting device, or the second blue lighting device; and whereby a third change in a third current flowing through the third power bus to the first blue lighting device and the second blue lighting device has no visible impact on light emitted by any of the first red lighting device, the second red lighting device, the first green lighting device, or the second green lighting device.

Example 41. A lighting system comprising: a flexible, elongated printed circuit board (PCB) having a width that is perpendicular to a length of the PCB, the PCB divided into a plurality of sections by cutlines extending across the width of the PCB; a first anode conductor and a first cathode conductor, affixed to the PCB, extending along the length of the PCB, passing through the plurality of sections, and crossing the cutlines; a second anode conductor and a second cathode conductor, both electrically isolated from the first anode conductor and the first cathode conductor, affixed to the PCB, extending along the length of the PCB, passing through the plurality of sections, and crossing the cutlines; each section of the plurality of sections comprising: a first lighting device affixed to the PCB and electrically coupled between the first anode conductor and the first cathode conductor; and a second lighting device affixed to the PCB and electrically coupled between the second anode conductor and the second cathode conductor.

Example 42. The lighting system of example 41, further comprising: a first cutline, of the cutlines, that separates a first section of the plurality of sections from a second section of the plurality of sections; a first contact on an exterior surface of the PCB in the first section and electrically connected to the first anode conductor; a second contact on the exterior surface of the PCB in the second section and electrically connected to the first anode conductor; a third contact on the exterior surface of the PCB in the first section and electrically connected to the first cathode conductor; a fourth contact on the exterior surface of the PCB in the second section and electrically connected to the first cathode conductor; a fifth contact on the exterior surface of the PCB in the first section and electrically connected to the second anode conductor; a sixth contact on the exterior surface of the PCB in the second section and electrically connected to the second anode conductor; a seventh contact on the exterior surface of the PCB in the first section and electrically connected to the second cathode conductor; and a eighth contact on the exterior surface of the PCB in the second section and electrically connected to the second cathode conductor; wherein the first section and the second section are independently operable after the PCB is separated at the first cutline.

Example 43. The lighting system of any of examples 41-42, further comprising visible markings on the PCB denoting locations of the cutlines.

Example 44. The lighting system of any of examples 41-43, wherein the first lighting device and the second lighting device of each section respectively comprise at least one light emitting diode (LED).

Example 45. The lighting system of any of examples 41-44, further comprising: a first power supply coupled to the first anode conductor and the first cathode conductor and configured to provide a first power of no more than 100 W of power at no more than 60 V; and a second power supply coupled to the second anode conductor and the second cathode conductor and configured to provide a second power of no more than 100 W of power at no more than 60 V;

wherein outputs of the first power supply are galvanically isolated from outputs of the second power supply; and a sum of the first power and the second power is greater than 100 W.

Example 46. The lighting system of any of examples 41-45, each section of the plurality of sections further comprising: a first power regulator affixed to the PCB, electrically coupled between the first anode conductor and the first cathode conductor and configured to provide first regulated power to the first lighting device; and a second power regulator affixed to the PCB, electrically coupled between the second anode conductor and the second cathode conductor and configured to provide second regulated power to the second lighting device.

Example 47. The lighting system of any of examples 41-46, further comprising a data input conductor affixed to the PCB; each section of the plurality of sections further comprising: a first circuit affixed to the PCB, communicatively coupled to the data input conductor, electrically connected to the first anode conductor and the first cathode conductor, and configured to receive first data from the data input conductor and to provide first modulated power to the first lighting device based on the first data; a second circuit affixed to the PCB, communicatively coupled to and electrically isolated from the data input conductor, electrically connected to the second anode conductor and the second cathode conductor, and configured to receive second data from the data input conductor and to provide second modulated power to the second lighting device based on the second data.

Example 48. The lighting system of example 47, further comprising an opto-isolator configured to electrically isolate the second circuit from the data input conductor.

Example 49. The lighting system of any of examples 41-46, each section of the plurality of sections further comprising: a section data input from a first adjoining section of the plurality of sections; a second data output to a second adjoining section of the plurality of sections opposite from the first adjoining section; a first circuit affixed to the PCB, communicatively coupled to the section data input, electrically connected to the first anode conductor and the first cathode conductor, and configured to receive first data, second data, and third data from the section data input, provide first modulated power to the first lighting device based on the first data, and send the second data and the third data out through a first data output; a second circuit affixed to the PCB, communicatively coupled to and galvanically isolated from the first data output, electrically connected to the second anode conductor and the second cathode conductor, and configured to receive the second data and the third data from the first data output, provide second modulated power to the second lighting device based on the second data, and send the third data out through the second data output.

Example 50. The lighting system of any of examples 41-49, wherein the first lighting device and the second lighting device both emit light with a common spectral characteristic.

Example 51. The lighting system of any of examples 41-50, wherein the first lighting device emits light with a first spectral characteristic and the second lighting device emits light with a second spectral characteristic.

Example 52. The lighting system of example 51, wherein the first spectral characteristic has a first correlated color temperature and the second spectral characteristic has a second correlated color temperature.

Example 53. The lighting system of example 51, wherein the first spectral characteristic has a first peak output having a first color and the second spectral characteristic has a second peak output having a second color.

Example 54. The lighting system of any of examples 41-53, further comprising: a third anode conductor and a third cathode conductor, both electrically isolated from the first anode conductor, the second anode conductor, the first cathode conductor, and the second cathode conductor, affixed to the PCB, extending along the length of the PCB, passing through the plurality of sections, and crossing the cutlines; each section of the plurality of sections further comprising: a blue lighting device affixed to the PCB coupled between the third anode conductor and the third cathode conductor; wherein the first lighting device comprises a red lighting device, the second lighting device comprises and a green lighting device; whereby a first change in a first current flowing through the first anode conductor to the respective red lighting device in each section of the plurality of sections has no visible impact on light emitted by the green lighting device and the blue lighting device of each respective section of the plurality of sections; whereby a second change in a second current flowing through the second anode conductor to the respective green lighting device in each section of the plurality of sections has no visible impact on light emitted by the red lighting device and the blue lighting device of each respective section of the plurality of sections; and whereby a third change in a third current flowing through the third anode conductor to the respective blue lighting device in each section of the plurality of sections has no visible impact on light emitted by the red lighting device and the green lighting device of each respective section of the plurality of sections.

The description of the various embodiments provided above is illustrative in nature and is not intended to limit this disclosure, its application, or uses. Thus, different variations beyond those described herein are intended to be within the scope of embodiments. Such variations are not to be regarded as a departure from the intended scope of this disclosure. As such, the breadth and scope of the present disclosure should not be limited by the above-described exemplary embodiments but should be defined only in accordance with the following claims and equivalents thereof.

We claim as follows:

I claim:

1. An LED lighting strip comprising: two or more sections including a first section and a second section divided by a cutline;

- a first power bus comprising a first anode contact and a first cathode contact to receive first power;
- a second power bus comprising a second anode contact and a second cathode contact to receive second power, the second power bus electrically isolated from the first power bus;
- a first LED in the first section electrically coupled to the first power bus;
- a second LED in the first section electrically coupled to the second power bus;
- a third LED in the second section electrically coupled to the first power bus; and
- a fourth LED in the second section electrically coupled to the second power bus.

2. The LED lighting strip of claim 1, further comprising additional sections having respective LEDs coupled to the first power bus and the second power bus so that a total power drawn by the LED lighting strip is over 100 W but the first power drawn through the first power bus is less than 100 W and the second power drawn through the second power bus is less than 100 W.

3. The LED lighting strip of claim 1, wherein the first LED, the second LED, the third LED, and the fourth LED all emit light with common spectral characteristic.

4. The LED lighting strip of claim 1, wherein the first LED and the third LED emit light with a first spectral characteristic and the second LED and the fourth LED emit light with a second spectral characteristic.

5. The LED lighting strip of claim 4, wherein the first spectral characteristic has a first correlated color temperature and the second spectral characteristic has a second correlated color temperature.

6. The LED lighting strip of claim 4, wherein the first spectral characteristic has a first peak output having a first color and the second spectral characteristic has a second peak output having a second color.

7. The LED lighting strip of claim 1, further comprising:

a first power regulator in the first section, electrically coupled to the first power bus and configured to provide first regulated power to the first LED;

a second power regulator in the first section, electrically coupled to the second power bus and configured to provide second regulated power to the second LED;

a third power regulator in the second section, electrically coupled to the first power bus and configured to provide third regulated power to the third LED; and a fourth power regulator in the second section, electrically coupled to the second power bus and configured to provide fourth regulated power to the fourth LED.

8. The LED lighting strip of claim 1, further comprising:

a strip data input;

a first circuit in the first section electrically coupled to the first power bus and configured to receive first data from the strip data input and provide first modulated power to the first LED based on the first data;

a second circuit in the first section electrically coupled to the second power bus and electrically isolated from the strip data input, configured to receive second data from the strip data input and to provide second modulated power to the second LED based on the second data;

a third circuit in the second section electrically coupled to the first power bus and configured to receive third data from the strip data input and provide third modulated power to the third LED based on the third data; and a fourth circuit in the second section electrically coupled to the second power bus and electrically isolated from the strip data input, configured to receive fourth data from the strip data input and to provide fourth modulated power to the fourth LED based on the fourth data.

9. The LED lighting strip of claim 8, further comprising an opto-isolator configured to galvanically isolate the second circuit from the strip data input.

10. The LED lighting strip of claim 1, further comprising:

a strip data input;

a first circuit in the first section having a first data input and a first data output, the first data input coupled to the strip data input, the first circuit coupled to the first power bus and configured to receive first data, second data, third data, and fourth data through the first data input, provide first modulated power to the first LED based on the first data, and send the second data, the third data, and the fourth data out through the first data output;

a second circuit in the first section having a second data input and a second data output, the second data input communicatively coupled to the first data output, the second circuit coupled to the second power bus and configured to receive the second data, the third data, and the fourth data through the second data input, provide second modulated power to the second LED based on the second data, and send the third data and the fourth data out through the second data output;

a third circuit in the second section having a third data input and a third data output, the third data input communicatively coupled to the second data output, the third circuit coupled to the first power bus and configured to receive the third data and the fourth data through the third data input, provide third modulated power to the third LED based on the third data, and send the fourth data out through the third data output; and a fourth circuit in the second section having a fourth data input and a fourth data output, the fourth data input communicatively coupled to the third data output, the fourth circuit coupled to the second power bus and configured to receive the fourth data through the fourth data input, and provide fourth modulated power to the fourth LED based on the fourth data;

wherein the first data output is electrically isolated from the second circuit;

the second data output is electrically isolated from the third circuit; and the third data output is electrically isolated from the fourth circuit.

11. The LED lighting strip of claim 1, further comprising:

a third power bus comprising a third anode contact and a third cathode contact to receive third power, the third power bus electrically isolated from the first power bus and the second power bus; and a first blue LED in the first section and a second blue LED in the second section electrically coupled to the third power bus;

wherein the first LED comprises a first red LED, the second LED comprises a second red LED, the third LED comprises a first green LED, and the fourth LED comprises a second green LED;

whereby a first change in a first current flowing through the first power bus to the first red LED and the second red LED has no visible impact on light emitted by any of the first green LED, the second green LED, the first blue LED, or the second blue LED;

whereby a second change in a second current flowing through the second power bus to the first green LED and the second green LED has no visible impact on light emitted by any of the first red LED, the second red LED, the first blue LED, or the second blue LED; and whereby a third change in a third current flowing through the third power bus to the first blue LED and the second blue LED has no visible impact on light emitted by any of the first red LED, the second red LED, the first green LED, or the second green LED.

12. A method to power a lighting strip, the method comprising:

providing first power to a first power bus of a lighting strip, the lighting strip having a plurality of sections separated by cutlines, the first power limited to no more than 100 W and no more than 60 V;

providing second power to a second power bus of the lighting strip, the second power bus electrically isolated from the first power bus, the second power limited to no more than 100 W and no more than 60 V;

powering a first lighting device in a first section of the plurality of sections of the lighting strip from the first power bus;

powering a second lighting device in the first section of the lighting strip from the second power bus;

powering a third lighting device in a second section of the plurality of sections of the lighting strip from the first power bus; and powering a fourth lighting device in the second section of the lighting strip from the second power bus.

13. The method of claim 12, further comprising:

independently modulating the first power and the second power to control a light output of the lighting strip.

14. The method of claim 12, further comprising:

turning off the first power and modulating the second power to set a light output of the lighting strip to an output brightness below a designated brightness level.

15. The method of claim 12, wherein a sum of the first power and the second power is greater than 100 W.

16. A lighting system comprising:

a flexible, elongated printed circuit board (PCB) having a width that is perpendicular to a length of the PCB, the PCB divided into a plurality of sections by cutlines extending across the width of the PCB;

a first anode conductor and a first cathode conductor, affixed to the PCB, extending along the length of the PCB, passing through the plurality of sections, and crossing the cutlines;

a second anode conductor and a second cathode conductor, both electrically isolated from the first anode conductor and the first cathode conductor, affixed to the PCB, extending along the length of the PCB, passing through the plurality of sections, and crossing the cutlines;

each section of the plurality of sections comprising:

a first lighting device affixed to the PCB and electrically coupled between the first anode conductor and the first cathode conductor; and a second lighting device affixed to the PCB and electrically coupled between the second anode conductor and the second cathode conductor.

17. The lighting system of claim 16, wherein the first lighting device and the second lighting device of each section respectively comprise at least one light emitting diode (LED).

18. The lighting system of claim 16, further comprising:

a first power supply coupled to the first anode conductor and the first cathode conductor and configured to provide a first power of no more than 100 W of power at no more than 60 V; and a second power supply coupled to the second anode conductor and the second cathode conductor and configured to provide a second power of no more than 100 W of power at no more than 60 V;

wherein outputs of the first power supply are galvanically isolated from outputs of the second power supply; and a sum of the first power and the second power is greater than 100 W.

19. The lighting system of claim 16, each section of the plurality of sections further comprising:

a first power regulator affixed to the PCB, electrically coupled between the first anode conductor and the first cathode conductor and configured to provide first regulated power to the first lighting device; and a second power regulator affixed to the PCB, electrically coupled between the second anode conductor and the second cathode conductor and configured to provide second regulated power to the second lighting device.

20. The lighting system of claim 16, further comprising a data input conductor affixed to the PCB; each section of the plurality of sections further comprising:

a first circuit affixed to the PCB, communicatively coupled to the data input conductor, electrically connected to the first anode conductor and the first cathode conductor, and configured to receive first data from the data input conductor and to provide first modulated power to the first lighting device based on the first data;

a second circuit affixed to the PCB, communicatively coupled to and electrically isolated from the data input conductor, electrically connected to the second anode conductor and the second cathode conductor, and configured to receive second data from the data input conductor and to provide second modulated power to the second lighting device based on the second data.

* * * * *